United States Patent [19]

Herman et al.

[11] Patent Number: 5,125,771

[45] Date of Patent: * Jun. 30, 1992

[54] APPARATUS FOR INTRODUCING BULK MATERIALS INTO PNEUMATIC CONVEYING LINE

[75] Inventors: Alvin Herman; Rubien Herman, both of Outlook; Ken Bokor, Saskatoon, all of Canada

[73] Assignee: Blowhard Pneumatic Services, Inc., Saskatoon, Canada

[ * ] Notice: The portion of the term of this patent subsequent to Feb. 11, 2009 has been disclaimed.

[21] Appl. No.: 687,596

[22] Filed: Apr. 17, 1991

Related U.S. Application Data

[63] Continuation-in-part of Ser. No. 514,757, Apr. 25, 1990, Pat. No. 5,087,155.

[51] Int. Cl.⁵ ............... B65G 53/08; B65G 53/10; B65G 53/48
[52] U.S. Cl. ............................. 406/57; 406/61; 406/145
[58] Field of Search ............... 406/53, 56, 60, 57, 406/61, 145, 173

[56] References Cited

U.S. PATENT DOCUMENTS

| | | | |
|---|---|---|---|
| 875,225 | 12/1907 | Vraaistad | 406/56 |
| 3,588,180 | 6/1971 | Herr | 406/60 |
| 3,876,261 | 4/1975 | Jucius, Jr. et al. | 406/145 |
| 4,114,785 | 9/1978 | Dugge | 406/153 |
| 4,279,556 | 7/1981 | Ronning | 406/53 |
| 4,793,743 | 12/1988 | Grolecki et al. | 406/173 |
| 4,913,597 | 4/1990 | Christianson et al. | 406/173 |

FOREIGN PATENT DOCUMENTS 094811  1/1983  European Pat. Off.

OTHER PUBLICATIONS

"Conveyair" brochure by Thor Manufacturing Ltd, undated.

Primary Examiner—Joseph F. Peters, Jr.
Assistant Examiner—Virna Lissi Mojica
Attorney, Agent, or Firm—Killworth Gottman Hagan & Schaeff

[57] ABSTRACT

A portable pneumatic conveyor for various bulk materials includes a hopper which supplies the bulk material to a feed tube. The feed tube is provided with a feed auger which advances the bulk material along the feed tube and into a chamber through which a current of air is passed by way of air inlet and air outlet lines connected to that chamber. The bulk material which is deposited within the chamber is fluidized by the air current and carried by the air current through the air line outlet and along the outlet conveying line to a storage site, such as a silo. In order to prevent air blowback through the feed tube and alongside the auger, the outlet end of the feed tube is provided with a gate which is intended to at least partly close when the flow of bulk material into the chamber slows down or stops.

17 Claims, 13 Drawing Sheets

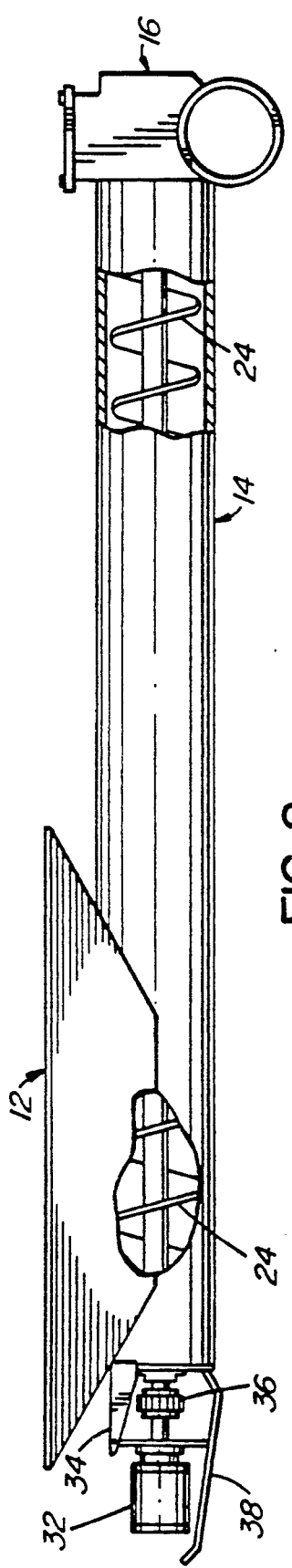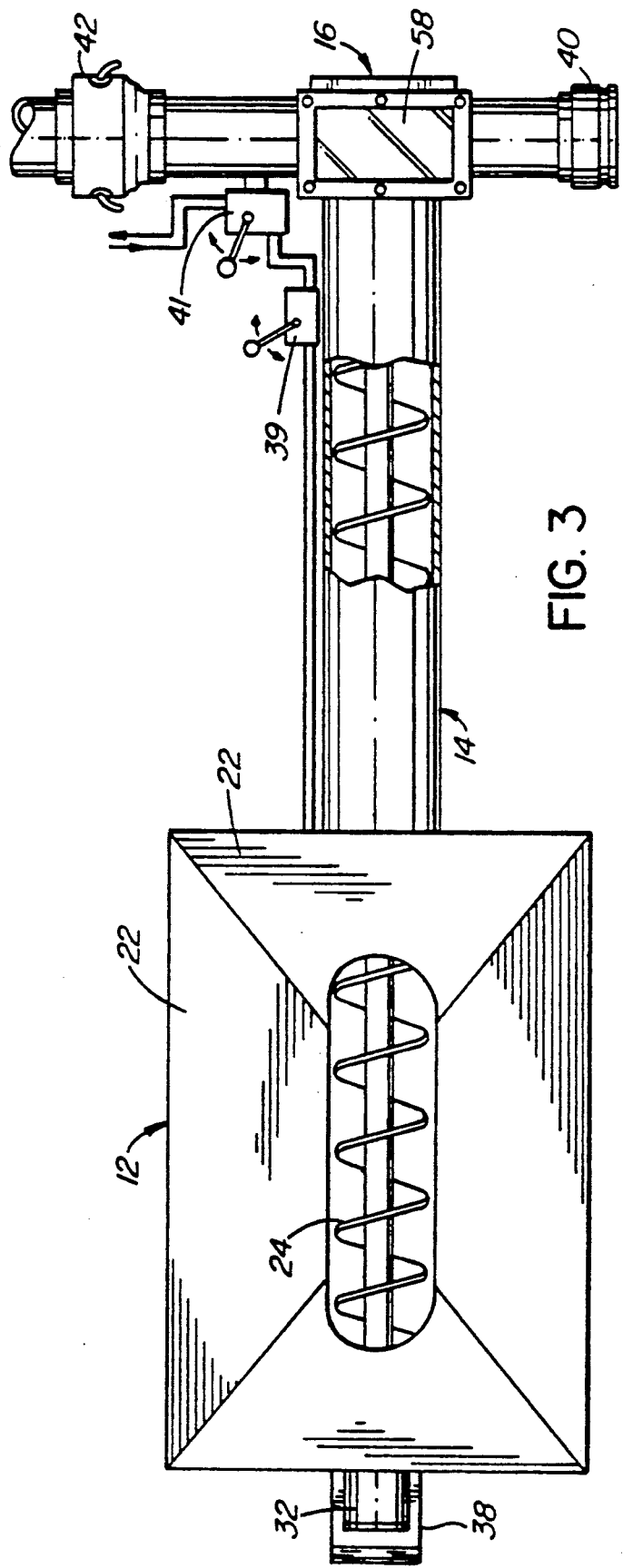

APPARATUS FOR INTRODUCING BULK MATERIALS INTO PNEUMATIC CONVEYING LINE

CROSS REFERENCE TO RELATED APPLICATIONS

This is a continuation-in-part of Ser. No. 514,757 filed Apr. 25, 1990 now U.S. Pat. No. 5,087,155.

BACKGROUND OF THE INVENTION

This invention relates to the pneumatic conveyance of materials and, in particular, to improved apparatus for introducing fluent bulk materials into a pneumatic conveying line.

In the pneumatic conveyance of various bulk materials it is well known to provide a hopper or similar collecting arrangement which supplies the bulk material to a feed tube. The feed tube in turn is provided with a suitable means, such as a feed auger, which advances the bulk material along the feeding tube and into some form of chamber through which a current of air is passed by way of air inlet and air outlet lines connected to that chamber. The bulk material which is deposited within the chamber is intended to be fluidized by the air current and carried by the air current through the air line outlet and along the outlet conveying line to a storage site, such as a silo.

In order to prevent air blow-back through the feed tube and alongside the auger, the outlet end of the feed tube is provided with a gate or other suitable one way valve arrangement which is intended to close when the flow of bulk material into the chamber slows down or stops thereby to prevent air blow-back through the feed tube and feed hopper. If blow-back occurs, the bulk material being handled may be sprayed around thus creating a potential hazard and, at least, a substantial cleanup problem.

The prior art has provided various devices of the nature indicated above as exemplified generally by the following U.S. patents:

| | | |
|---|---|---|
| 560,381 | Wainwright et al | May 19, 1896 |
| 3,106,428 | Lenhart | Oct. 8, 1963 |
| 3,460,869 | Herr | Aug. 12, 1969 |
| 3,588,180 | Herr | June 28, 1971 |

One notable problem with all or virtually all of the prior art devices is that they were prone to a build-up of the material on or adjacent to the movable gate. After a period of time the gate would not close properly thus creating a substantial blow-back problem. Many of the prior art units were also prone to plugging thus requiring substantial down-time to partially dismantle the device and to remove the plugged up material.

Part of the problem with many of the prior art designs is that the internal configuration in the region of the gate is such that inadequate fluidization of many materials does not take place thus resulting in the build-up of deposits which eventually render the apparatus inoperative. In addition, no means were provided whereby the operator could observe the action occurring in the vicinity of the gate and take appropriate remedial action before plugging or blow-back occurred.

Another problem inherent in many or all of the prior art devices is that they are not sufficiently versatile. Most of them were designed for either only one or a very small number of very similar products. If an attempt is made to use them with products having substantially different characteristics, problems resulting from gate deposit build-up, plugging, and blow-back soon arise.

Another problem inherent in most, if not all, of the prior art devices of the type under consideration is that they are only intended to be used in one fixed location. This necessitates the use of highly specialized and relatively expensive equipment for transporting dry bulk materials. In the past these dry bulk materials have been transported by pneumatic trailers and a relatively small number of specially designed rail cars. In the case of the so-called pneumatic trailers (which are intended for highway use), the entire vessel or container is pressurized during the unloading operation and this necessitates an extremely expensive structure. This, in turn, tends to increase shipping costs. Because of the specialized nature of the container, the pneumatic trailer is generally only usable one way thus meaning that the return trip is made with no load. This again keeps shipping costs high. Various fluent bulk materials, such as cement, lime, sand, salt and various dry chemicals, are commonly carried in this fashion.

SUMMARY OF THE INVENTION

It is a general objective of the present invention to alleviate or overcome the various difficulties noted above and to provide apparatus for successfully introducing a wide variety of fluent bulk materials into a pneumatic conveying line and which is substantially free from the plugging and blow-back problems inherent in the prior art devices.

A further objective is to provide apparatus of the type under consideration wherein the operator can readily observe the action occurring in the vicinity of the gate and take remedial action so as to increase or decrease the rate of flow of the bulk material thereby to provide optimum performance.

A further objective of the invention is to provide apparatus of the type under consideration which is readily portable from one job site to another and which is of a relatively low-profile configuration so that it can be slipped under a conventional hopper bottom trailer so as to receive the bulk material from it thus enabling use of the much less expensive hopper bottom trailers, which trailers can carry a load both ways, thus substantially reducing overall shipping costs.

A further object of the invention is to provide apparatus of the type under consideration which is capable of successfully handling a very wide variety of fluent bulk materials, all the way from very light and relatively easily handled materials such as flour right through to the more difficult materials such as cement, lime, salt and the like.

Accordingly, the present invention in one aspect relates to apparatus for introducing fluent bulk materials into a pneumatic conveying line, comprising:

(a) a fluidizing chamber having an air line inlet and an air line outlet for connection to incoming and outgoing air lines respectively;

(b) a feed tube connected to the fluidizing chamber, and having an outlet end disposed within said chamber;

(c) an assembly for effecting movement of the bulk material through said feed tube from a source of supply into the interior of the fluidizing chamber so that the material may, during use, be fluidized by an air flow passing through the fluidizing chamber from said air line inlet to and through said air line outlet and carried therewith out through the air line outlet;

(d) a gate associated with said feed tube and responsive to opposing forces exerted thereon by the bulk material moving through the feed tube and the pressure of the air within the fluidizing chamber for permitting flow of said bulk material into said fluidizing chamber through the feed tube and at the same time preventing blow back of air from the fluidizing chamber through said feed tube.

In accordance with an aspect of the invention, the air line inlet and the air line outlet noted above are located in substantial alignment with one another along a first axis. The feed tube defines a further axis which is laterally arranged relative to the first axis and is displaced from it in such a way that, during use, bulk material exiting the outlet end of the feed tube falls downwardly under the influence of gravity and passes into and is fluidized by the air flow passing through the fluidizing chamber along the first axis from the air line inlet to the air line outlet.

An alternative aspect of the invention provides a low profile inlet means connected to an inlet end of the feed tube to allow the inlet means to be located below the outlet of a hopper bottom trailer or the like. A resilient gasket may be secured on the inlet means and adapted to effect sealing engagement with the outlet of the hopper bottom trailer when brought into close engagement therewith. Suitable means may be provided for lifting and lowering at least that end of the apparatus to which the inlet means and gasket are secured so that when lowered, the apparatus may be positioned with the inlet means below and spaced from the outlet of the hopper and the apparatus thereafter raised to bring the gasket into sealed relation around the hopper outlet.

Preferably and in accordance with another aspect of the invention, the gate is adapted for movement from a closed position in close contacting relation to the outlet end of the feed tube to and through a range of partially open positions. Several versions of the gate are possible, including hinged gate assemblies as well as flexible gates, all of which will be described in further detail later. During use, the bulk material applies a force to one face of the gate while the pressure of the air applies a force to the opposing face of the gate so that in use a moving plug of the materials forms adjacent said gate thus helping to avoid blow-back of pressurized air from the fluidizing chamber through the feed tube.

As a still further aspect of the invention there may be provided spring means which, together with pressure of air in said fluidizing chamber when in use, biases said gate toward said feed tube thereby enhancing the formation of the above-noted plug and reducing blow-back of the bulk material.

In a preferred form of the invention, the fluidizing chamber includes a gate chamber and an air duct section. The air duct section typically includes a tubular section having the air line inlet and the air line outlet disposed at opposing ends thereof. The gate chamber is secured to the air duct section and has its lower end portion opening into and freely communicating with the interior of the duct section. As a result of this construction, the bulk materials falling downwardly by gravity from the outlet end of the feed tube pass into a central region of maximum air flow velocity within the air duct section to effect substantially complete fluidization of the bulk material.

Still further according to a feature of the invention, the above-noted gate is disposed in the fluidizing chamber such that, during use, a substantial lower portion of the gate is disposed within the region of maximum air flow velocity so that the resulting air currents tend to keep the gate clear of deposits which might otherwise tend to prevent full closure of the gate.

In a preferred form of the invention, the above-noted assembly for effecting movement of the bulk material through the feed tube includes a variable speed drive and suitable means to control this drive. The control means preferably includes start, stop and reverse valve means for controlling the movement of material through the feed tube. This facilitates safe operation and allows the safe removal of certain foreign materials that may from time to time become lodged in the feed tube. The fluidizing chamber is typically provided with a viewing port above the gate so that the operator can control the rate of movement of material through the feed tube by way of a speed control valve in accordance with conditions as observed within the fluidizing chamber. All of this permits remedial action to be taken before a plugging situation occurs.

An alternative arrangement of the invention provides a vacuum cyclone chamber secured to an inlet portion of the feed tube, and having a tangential suction inlet for air and bulk material, and an exit for withdrawing air from the chamber, the inlet and exit arranged so that air and bulk material spiral in said chamber and the bulk material settles toward the bottom thereof, there being an exit opening in the bottom communicating with the assembly for moving bulk material through the feed tube toward the fluidizing chamber. The apparatus provides for an efficient air lock, i.e. the rotating vaned air lock of prior art devices is not used thus resulting in less energy consumption during material conveyance.

As a further desirable alternative feature of the invention, a low profile inlet hopper is connected to an inlet end of the feed tube. This low profile hopper allows the apparatus to be located below and to receive bulk material from the outlet of a hopper bottom trailer or the like.

Another version of the invention provides a plurality of small diameter feed tubes coupled to a common fluidizing chamber, each feed tube having its own gate valve. This enables one to provide a very low profile apparatus for use on extremely low hopper bottom rail cars and the like.

Inlet flow control means are typically provided in the hopper to control the rate of flow of bulk material into the feed tube and the device for effecting movement of the bulk material through the feed tube. The device for effecting such movement is typically a feed screw, otherwise known as a feed auger.

The above-noted means (e.g. the feed auger) for effecting movement of the bulk material through the feed tube is located in a lower portion of the hopper. The inlet flow control means is typically disposed just above the previously noted means (e.g. feed auger) and may take the form of an inverted V-shaped baffle having suitable means thereon such as adjustable plates arranged to allow the rate of flow of material from the hopper toward and into the feed tube to be varied as desired. An alternative control comprises a slidable gate for controlling the flow into the feed auger, both versions to be described more fully hereafter.

Further features, objects and advantages of the present invention will become apparent to those skilled in the art after reading the following description of the preferred embodiment of the invention taken in conjunction with the appended drawings.

BRIEF DESCRIPTION OF THE VIEWS OF DRAWINGS

FIG. 2 is a side elevation view of the apparatus, certain portions of the same being cut away so as to show the internal feed auger;

FIG. 3 is a top plan view of the apparatus, a portion of the feed tube being cut away to show the feed auger and the flow control assembly for the hopper having been removed so as to also show the feed auger;

DETAILED DESCRIPTION OF THE PREFERRED EMBODIMENT

Figure 1:
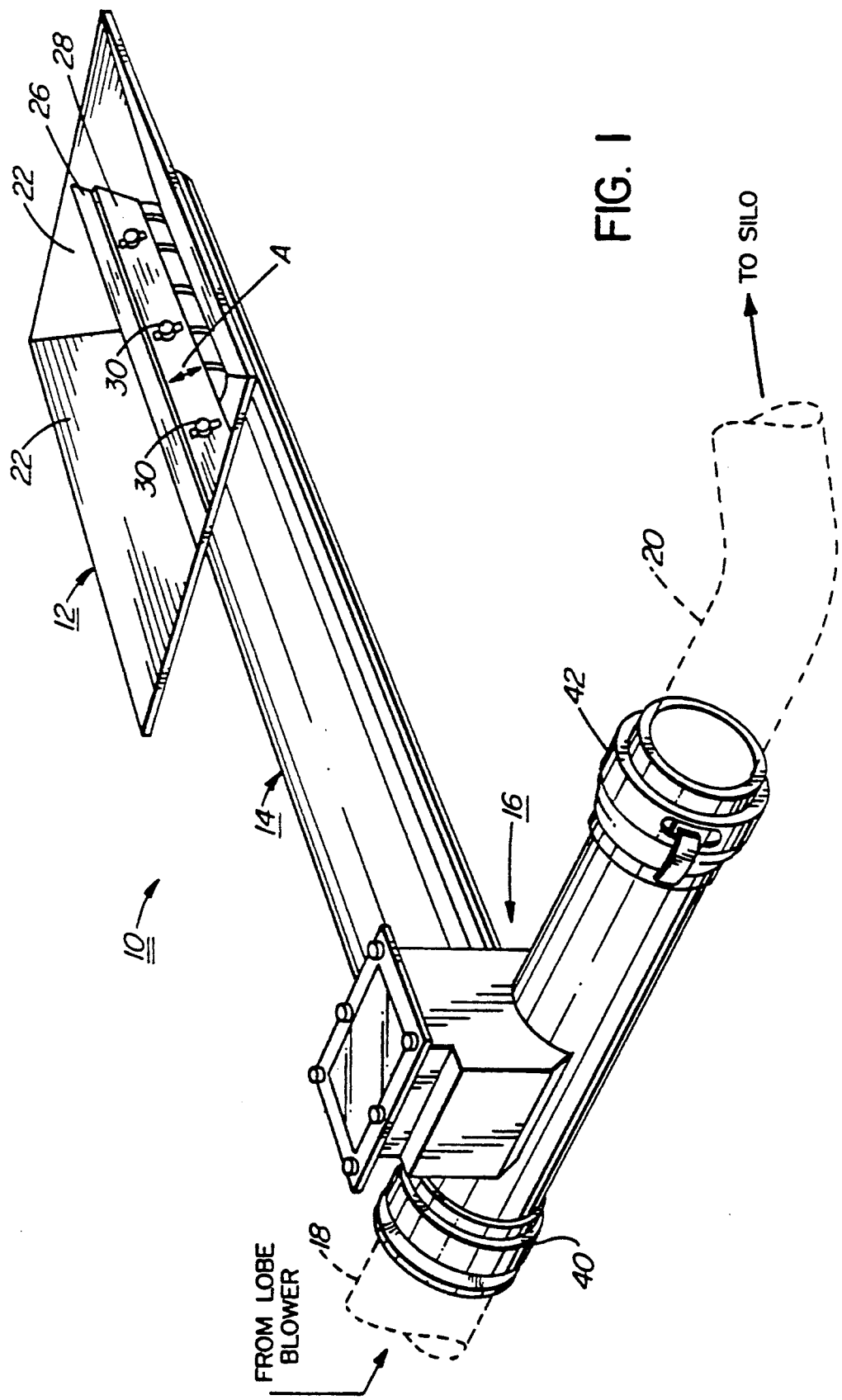
FIG. 1 is a perspective view of an apparatus for introducing fluent bulk materials into a pneumatic conveying line.
Figure 4:
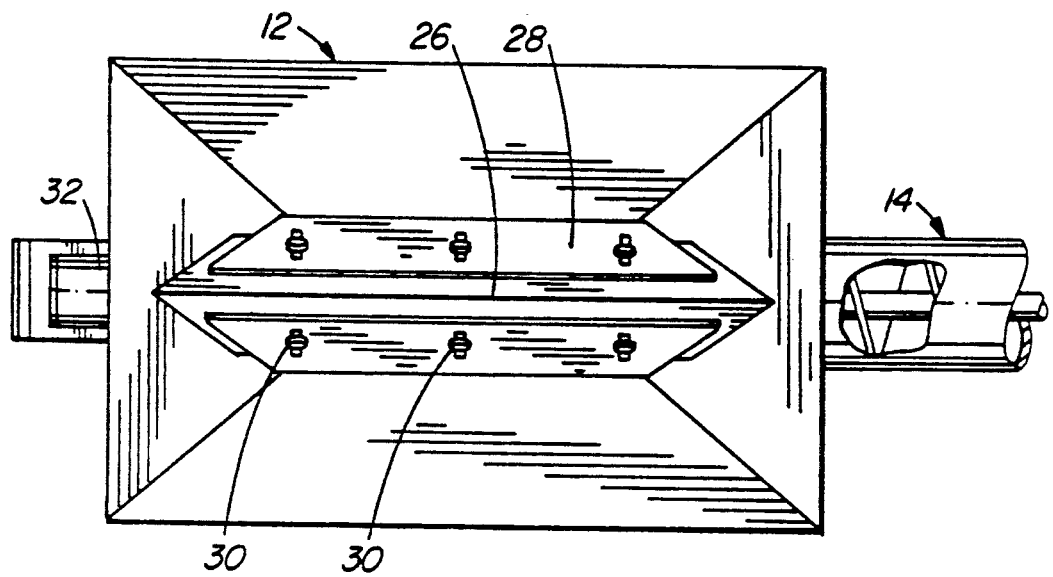
FIG. 4 is a top plan view of the hopper with the flow control assembly in place above the feed auger.

Referring now to the drawings there is shown a preferred form of the apparatus for introducing the fluent bulk materials into the pneumatic conveying line, such apparatus being generally designated by reference numeral 10. The apparatus includes a low-profile hopper 12 which is mounted adjacent one end of an elongated feed tube 14. Feed tube 14 is connected to and enters into a fluidizing chamber 16. The fluidizing chamber 16 is provided with a flow of pressurized air from a suitable blower, preferably a positive displacement lobe blower (not shown), by way of an inlet air line 18 (shown in dotted lines), and the suspended or fluidized bulk material-air mixture leaves via air outlet line 20 (also shown in dotted lines) and is transported thereby to a suitable storage means such as a silo (not shown). The inlet air line 18 and air outlet line 20 are interchangeable, thus helping to allow the apparatus to be used in its most efficient and convenient position.

The above-noted infeed hopper 12 is provided with four shallowly sloping walls 22, the lower edges of which are secured, as by welding, to the wall of the feed tube 14. The overall height of the apparatus is preferably kept to about 12 inches so that the hopper end of the apparatus may be slid beneath a hopper bottom trailer and the hopper 12 positioned below an outlet port.

In order to control the flow of bulk material from the interior of hopper 12 into a feed auger 24 which extends within the feed tube 14, there is provided an inverted V-shaped baffle 26 which extends between and is welded to the opposing end walls 22 of the hopper. This baffle 26 is provided with an opposed pair of adjustment plates 28 which may each be slid upwardly or downwardly in the direction of arrows A thereby to increase or decrease the size of the gap existing between the lower edge of the respective adjustment plate and the adjacent hopper wall 22. These adjustment plates are secured to baffle 26 via a multiplicity of bolts 30 which extend through suitable slots in the adjustment plates 28 thereby to allow the plates 28 to be firmly secured in the desired adjusted positions.

The above-noted feed auger 24 is of a conventional design and extends from one end to the other of the feed tube 14. In order to drive the feed auger 24 in rotation, there is provided, at the hopper end of the feed tube 14, a hydraulic drive motor 32 of any suitable commercially available variety, this hydraulic motor 32 being secured to the end of the feed tube via a mounting bracket 34. The outlet drive shaft of the hydraulic motor is connected to the shaft of the feed auger 24 by way of a suitable flex coupling 36. A short skid 38 is also affixed to the hopper end of the feed tube 14 and extends below the hydraulic motor 32 both to protect the hydraulic motor and to allow the apparatus to be slid into position beneath a hopper bottom trailer or the like.

With reference to FIG. 3, the hydraulic motor 2 is controlled by way of a control valve module 39 mounted by a suitable bracket to the fluidizing chamber 6. By means of this control valve 39, (which is of any suitable commercially available variety), the operator can start, stop and reverse the motor. To increase or decrease the rate of rotation of the hydraulic motor a flow control valve 41 is provided. These valves together enable the operator to exert a close degree of control on the rate at which the feed auger 24 conveys bulk material toward the fluidizing chamber 16 and enables the operator to take remedial action when appropriate.

As noted previously, the fluidizing chamber is provided with air line inlet 40 and air line outlet 42 which are connected to respective inlet and outlet air lines 18 and 20. The incoming and outgoing air lines are each provided with a semi-smooth bore thereby to reduce air friction and the air line inlet and outlet also are each preferably provided with couplers enabling quick connections to be made to the incoming and outgoing air lines. One suitable type of coupler is known as the "Cam-Lock" coupler which provides for quick attachment and detachment while at the same time providing a smooth internal bore so as to reduce air friction losses as well as providing a tight air seal at the point of connection.

The air line inlet and outlet 40, 42 may be interchangeable with one another to increase the versatility of the apparatus. The cam-lock or similar quick couplers will permit the direction of air and product flow to be reversed very quickly.

Figure 5:
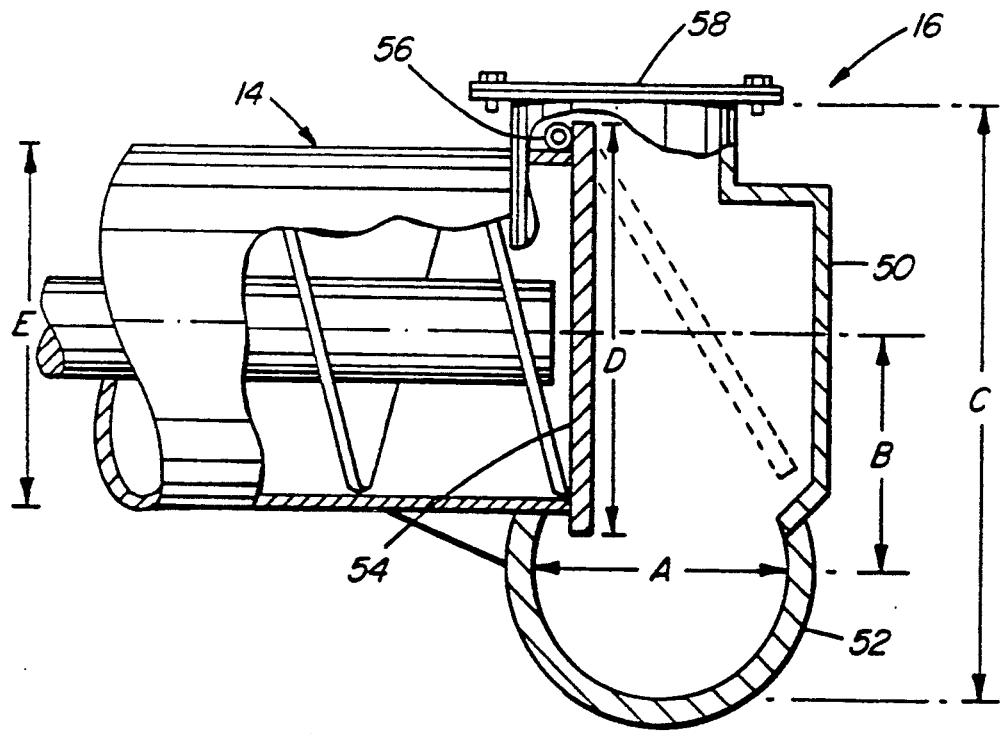
FIG. 5 is a partial section view through the fluidizing chamber showing the outlet end of the feed tube as well as open and closed positions of the gate within the fluidizing chamber.
Figure 6:
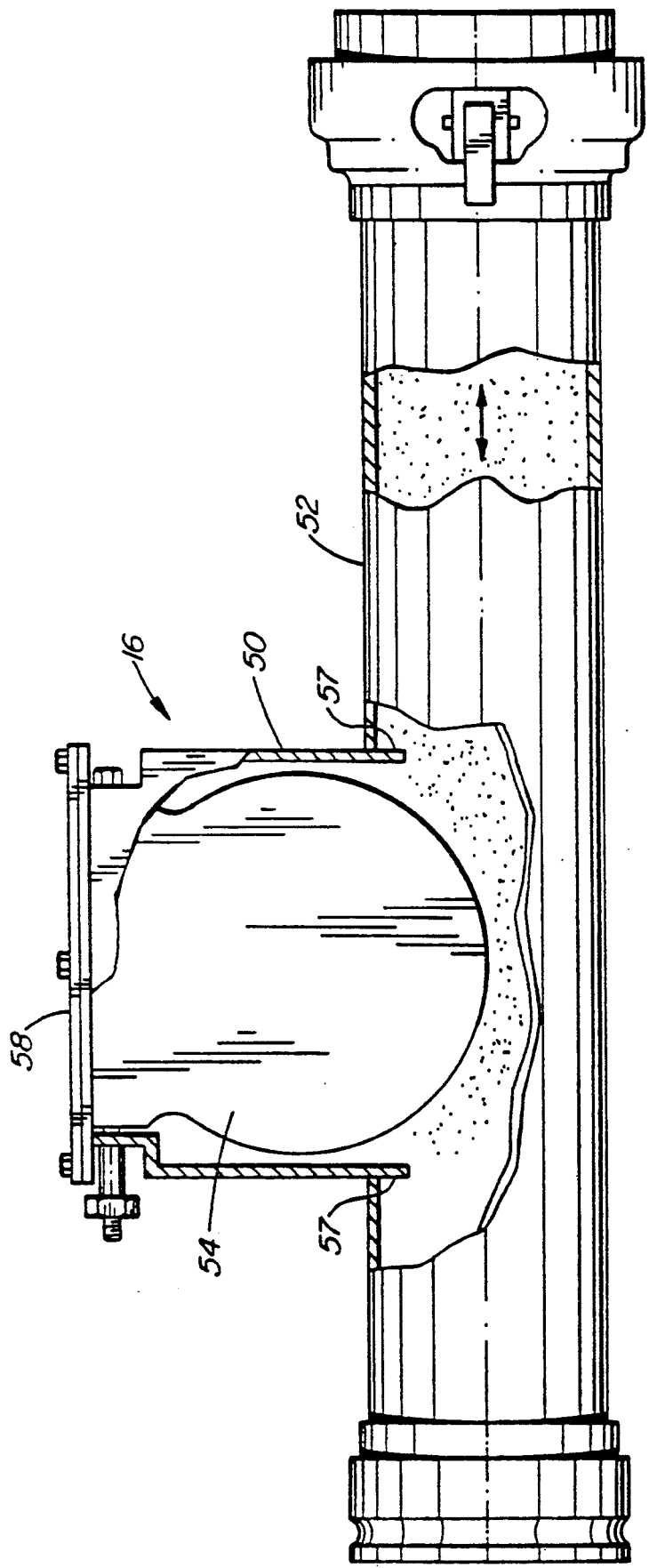
FIG. 6 is an end elevation view of the apparatus, a wall of the fluidizing chamber having been cut away so as to show the internal configuration including the outline configuration of the gate.

With particular reference to FIGS. 5 and 6, it will be seen that the fluidizing chamber 16 comprises a gate chamber 50 attached to and located above an air duct section 52. The air duct section comprises a tubular section having the above-noted air line inlet 40 and the air line outlet 42 disposed at opposing ends of same. The box-like gate chamber 50 is secured, as by welding, to the air duct section 52 and has its lower end portion opening into and freely communicating with the interior of the air duct section 52 as clearly illustrated in FIGS. 5 and 6.

It was previously noted that the feed tube 14 has its outlet end disposed within the fluidizing chamber 16. As shown in FIGS. 5 and 6, a gate 54 is located at the outlet end of the feed tube 14 within the fluidizing chamber 16 and is exposed, in use, to the airflow which passes through the fluidizing chamber from the air line inlet 40 to and through the air line outlet 42. This gate 54 is responsive to the opposing forces exerted thereon by the bulk material which is being forced through the feed tube 14 by the feed auger 24, and by the pressurized air within the fluidizing chamber. In operation this gate 54 acts to permit the flow of bulk material into the fluidizing chamber 16 while at the same time interacting with the bulk materials to prevent blow-back of pressurized air from the fluidizing chamber through the feed tube 14 and outwardly of the inlet hopper 12. In operation, the bulk material is compressed somewhat as the feed auger pushes the material against the inside surface of the gate thus forming a "plug" of moving material that interacts with the surrounding structures to prevent blow-back.

It will be seen with particular reference to FIGS. 5 and 6 that the air line inlet and the air line outlet 40, 42 are located in substantial alignment with one another along a first axis which extends lengthwise and is centered with the air duct section 52 of the fluidizing chamber. The feed tube 14 defines a further axis (which axis extends lengthwise of the feed tube and is centered with the rotation axis of the feed auger 24), such further axis being transversely arranged relative to the first axis noted above. The further axis defined by feed tube 14 is also displaced upwardly from the first axis in such a way that, during use, the bulk material exiting from the outlet end of the feed tube 14 falls downwardly under the influence of gravity and hence passes into and is fluidized by the air flow passing through the fluidizing chamber 16 along the first axis from the air line inlet 40 to the air line outlet 42.

The above-noted gate 54 comprises a flat plate of sufficient size as to butt up firmly against the inner end of the feed tube 14 when gate 54 is in its closed position. The gate is hinged adjacent its upper edge by way of hinge 56 fixed to the outlet end of the feed tube 14. Gate 54 can thus pivot from a closed position in close contacting relation to the outlet end of the feed tube 14 to and through a range of partially open positions. One such partially open position is illustrated in dashed lines in FIG. 5. During use, as noted previously, the incoming bulk material applies a force to one face of the gate 54 while the pressure of the air within the fluidizing chamber 16 applies a force to the opposing face of the gate.

By virtue of the structure as described above and illustrated in the drawings especially the relationship between the feed tube outlet and the air duct section of the fluidizing chamber, the bulk materials entering fluidizing chamber 16 fall downwardly by gravity from the outlet end of the feed tube 14 and almost immediately pass into a central region of maximum air flow velocity within the above-described air duct section 52 thus effecting substantially complete fluidization of the bulk material. The bulk material has almost no chance of lodging against and building up on any fixed surface from whence it could create gate closure or plugging problems. In this connection the small downwardly extending baffle portions 57 (see FIG. 6) located in flanking relation to the gate 54 ar of assistance in establishing air current patterns and velocities which enhance the fluidization process.

It will also be noted that the above-described gate 54 is disposed in the fluidizing chamber 16 in a manner such that, during use of the apparatus, a substantial lower portion of the gate (approximately one-quarter to one-third of it) is disposed within the region of maximum air flow velocity so that the resulting air currents tend to keep the gate surfaces clear of deposits which might otherwise tend to prevent full closure of the gate.

The upper or top face of the gate chamber 50 is provided with a viewing port 58 of plexiglass plate or round slugs of plexiglass with protruding steel section to protect the plexiglass from abrasive material thus enabling the operator to observe conditions existing within the fluidizing chamber 16, particularly conditions in the immediate region of the gate 54. By manipulating the closely adjacent hydraulic flow control valve 41, the operator can control the rotation of the feed auger 24 in accordance with conditions as observed within the fluidizing chamber 16. This permits remedial action to be taken before a plugging condition actually occurs.

For the further guidance of those skilled in this art the following detailed example is set forth, it 15 being realized that the invention is not to be limited to the details given but that reasonable modifications may be made by those skilled in this art.

EXAMPLE

With reference again to FIG. 5 some details for a typical embodiment are given below:

| DIMENSIONS: | | |
|---|---|---|
| A | diameter of air duct section | 6.0 ins. |
| B | distance between LC of feed tube and LC of air duct section | 5.3 ins. |
| C | total height of fluidizing chamber | 13.4 ins. |
| D | total height of a gate | 9.3 ins. |
| E | diameter of feed tube | 8.0 ins. |
| AIR LINE: | | |
| semi-smooth bore | | 6 in. inside dia. |
| air line length (incoming & outgoing) | | 50 ft. approx. |
| "Cam-Lock" couplers-quick detach-tight seal smooth bore | | |
| BLOWER: | | |
| Positive displacement | | |
| lobe-type (make "Vana"; model RSBS) output (this example) | | 1100 cfm @ 6 p.s.i. |
| MATERIAL: | | |
| salt | | |
| RATE OF CONVEYANCE: | | |
| rate of flow = | | 1 ton/minute approx. |

It will be realized by those skilled in this art in light of the foregoing description that the apparatus described herein is extremely versatile and capable of being utilized in an extremely wide variety of situations. The apparatus is extremely simple and, being portable, can be readily carried from one job site to another in a relatively small vehicle, which vehicle also carries the other related ancillary equipment such as the inlet and outlet air lines, the lobe blower, and the hydraulic pump, supply lines and hydraulic reservoir and so on. It should also be realized that several of the devices as described may be used, each receiving bulk material from a different source to enable the blending of several fluent bulk materials to provide a specific blend, the several devices being linked together by a common conveying line and sharing a common blower. Numerous advantages will be readily apparent to those skilled in the art.

A modified form of the apparatus 110 is shown in FIGS. 7-12. Since much of the apparatus is the same as that described with reference to FIGS. 1-6, like components of the apparatus need not be described further and the following description will concentrate on the differences over the embodiment of FIGS. 1-6.

The hopper 200 differs from the low profile hopper 12 described previously in that it has been truncated (i.e. reduced in height) and the internal baffle removed. A rectangular plate 202 is welded to the mouth of the hopper 200, the plate having a central rectangular opening 204 matching the opening of the hopper. The opening 204 has a large mesh screen (e.g. 3 ins.) over it to prevent large solid lumps from entering and which might otherwise block the conveyance system downstream.

The upper surface of the plate 202 is provided with a gasket 206 in the form of a layer of thick, resilient foam rubber (e.g. 4 ins. thick) of medium density, the foam rubber gasket having a central opening corresponding to the central opening in the plate 202. The function of this thick gasket layer will become apparent later. The gasket layer is firmly bonded to the plate 202 by any suitable adhesives.

In order to control the flow of fluent bulk material into the hopper 200 via the opening 204, there is provided a sliding gate valve assembly 208 including a flat control gate 210 sized to enter into the hopper via a narrow slot between the plate 202 and the hopper frontal portion. A plastic lip seal 212 bolted to the hopper frontal wall makes sliding contact with the lower surface of the gate 210 to help prevent escape of the fluent material. The gate 210 is advanced and retracted to control the effective material inflow area at the feed auger inlet. This motion is accomplished via an elongated gear rack 214 secured at its frontal end to gate 210 and extending rearwardly into engagement with a drive pinion 216. The drive pinion 216 is rotated by a crank assembly 218 journalled in a bracket and bearing assembly 219 mounted to the feed tube 114.

Mounted to the hopper end of the feed tube 114, below the plate 202 are a pair of bell cranks 220, each disposed on a respective side of the feed tube 114 and pivotally connected thereto via pivot bracket 222. A ground-engaging wheel 224 (preferably with a rubber tire) is journalled to the distal end of each bell crank 220 while the proximal end of each bell crank is pivotally connected at 226 to the extensible ram 228 of a respectively associated actuator 230. Rotation of the actuator hand cranks 232 causes the rams 228 to retract inwardly or extend outwardly of the actuator bodies hence causing pivoting of the bell cranks 220 about their respective pivot points as defined by pivot brackets 222. In the extended condition the wheels 224 occupy the dashed line position of FIG. 8 and, when retracted, the solid line position also shown in FIG. 8.

The opposing end of the apparatus 100, i.e. the end at the fluidizing chamber 116, is provided with a further actuator 230. When its crank 232 is operated its ram 228 moves inwardly or outwardly, causing base plate 236 to be moved upwardly or downwardly between the positions shown to effect lifting and lowering of that end as desired.

Figure 7:
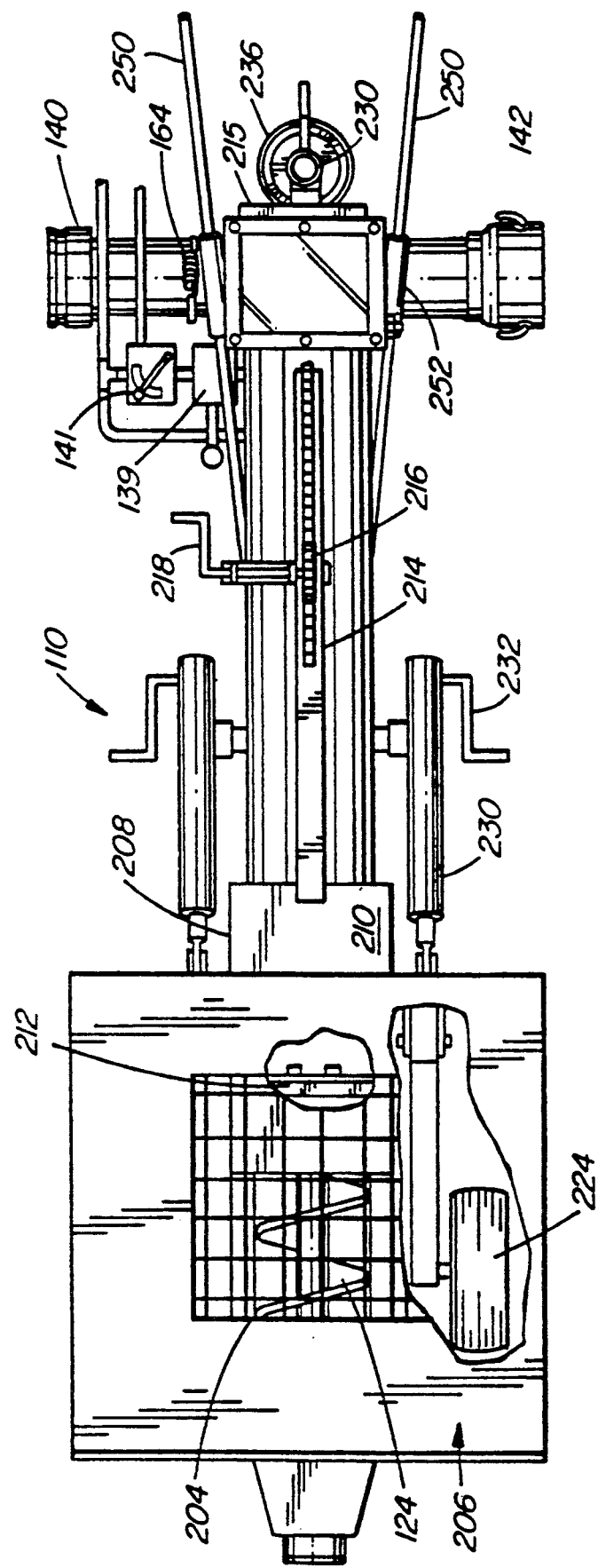
FIG. 7 is a plan view of a second the apparatus according to the invention.
Figure 8:
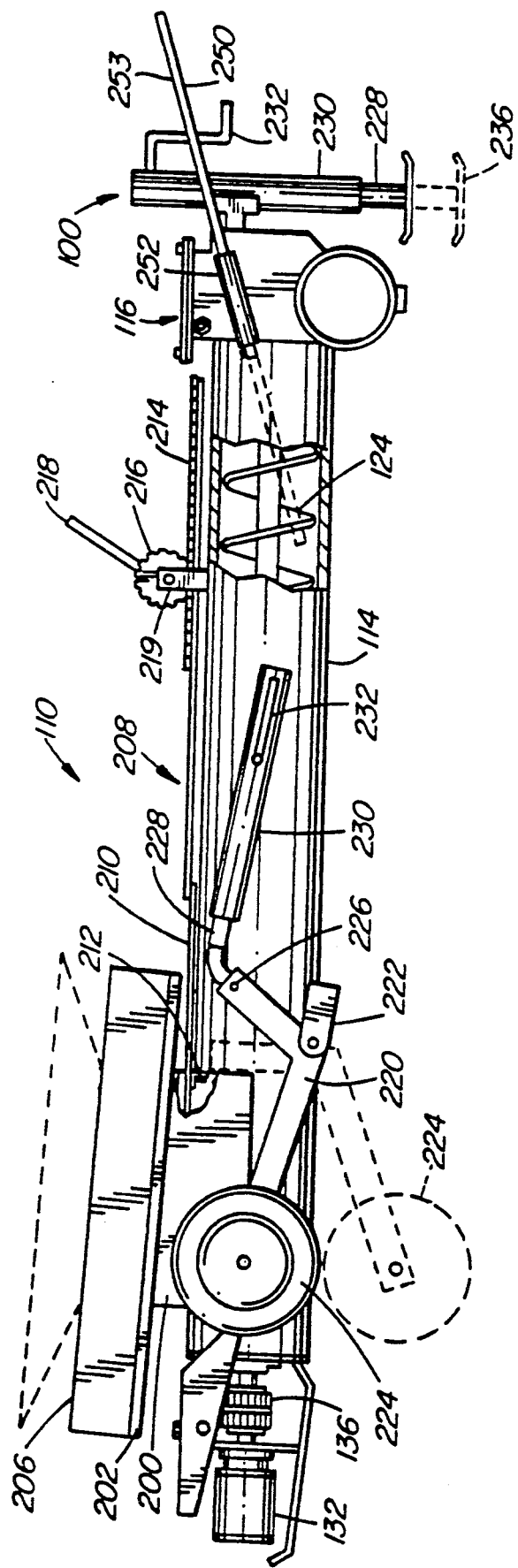
FIG. 8 is a side elevation view of the apparatus of FIG. 7.

Also as shown in FIGS. 7 and 8 the apparatus 110 is provided with a pair of retractable handles 250 to assist one in wheeling the apparatus into and out of the loading position. The handles 250 each comprise an elongated rod slidably disposed in respective sleeves 252 welded to the fluidizing chamber 116. Stop pins 253 limit the degree of retraction and extension of handles 250 to the required degree.

Figure 8A:
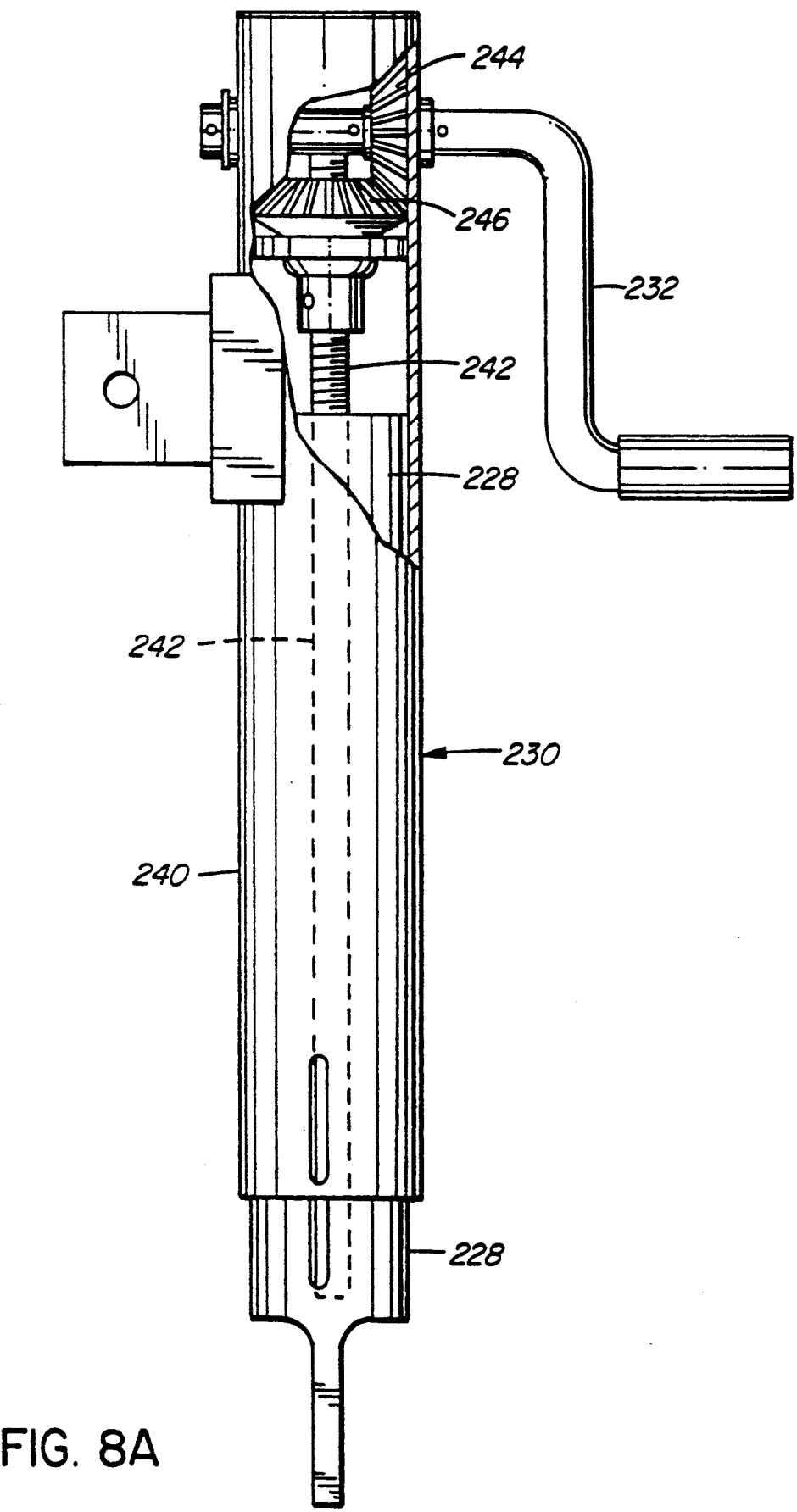
FIG. 8A is a partly cut-away view of an actuator.

The actuators 230 are of the construction as shown in FIG. 8A and may be of a commercially available variety. The actuators each have a tubular steel casing 240 within which is slidably disposed the elongated ram 228 as noted above. The upper end of the casing 240 journals the hand crank 232 which rotates an elongated screw 242 within the casing via bevel gears 244, 246. Screw 242 is threaded into the ram 228. Hence as screw 242 is rotated via crank 232 the ram 228 is forced to move inwardly or outwardly as described above. It should be realized that fluid activated actuators may be utilized in place of the screw actuated devices described above.

In operation, the handles 250 are extended and the apparatus 110 is moved endwise in wheel-barrow-like fashion (with wheels 224 retracted) under a hopper trailer (not shown) until the hopper outlet is above the opening 204. The actuators 230 are operated via cranks 232 to cause wheels 224 to be extended and the base plate 236 to move down relative to the apparatus thus causing the apparatus 110 to be lifted upwardly thus bringing the foam rubber gasket 206 into contact with the hopper bottom all around the hopper opening and helping to prevent escape of the bulk material being handled. This is especially desirable when certain finely divided (powdery) solids are being handled such as lime or cement. The gasket 206 is therefore made sufficiently wide and thick as to accommodate and form a seal against the various types and sizes of hopper bottoms likely to be encountered in normal use. In the embodiment shown the outside dimensions of the gasket are about 36 inch by 36 inch and the inside dimensions (the opening) are about 17.5 inch to 17.5 inch. The thicker the gasket, the greater the degree of irregularity which can be tolerated while still forming a good seal.

After use, the actuators 230 are operated in the reverse direction to lower the assembly downwardly so that the gasket 206 clears the hopper bottom, following which the complete apparatus can be pulled outwardly from beneath the hopper trailer via handles 250 and moved to another location. In use, the improvement described above greatly assists in preventing escape of the bulk materials, especially light powdery ones, into the environment.

Figure 9:
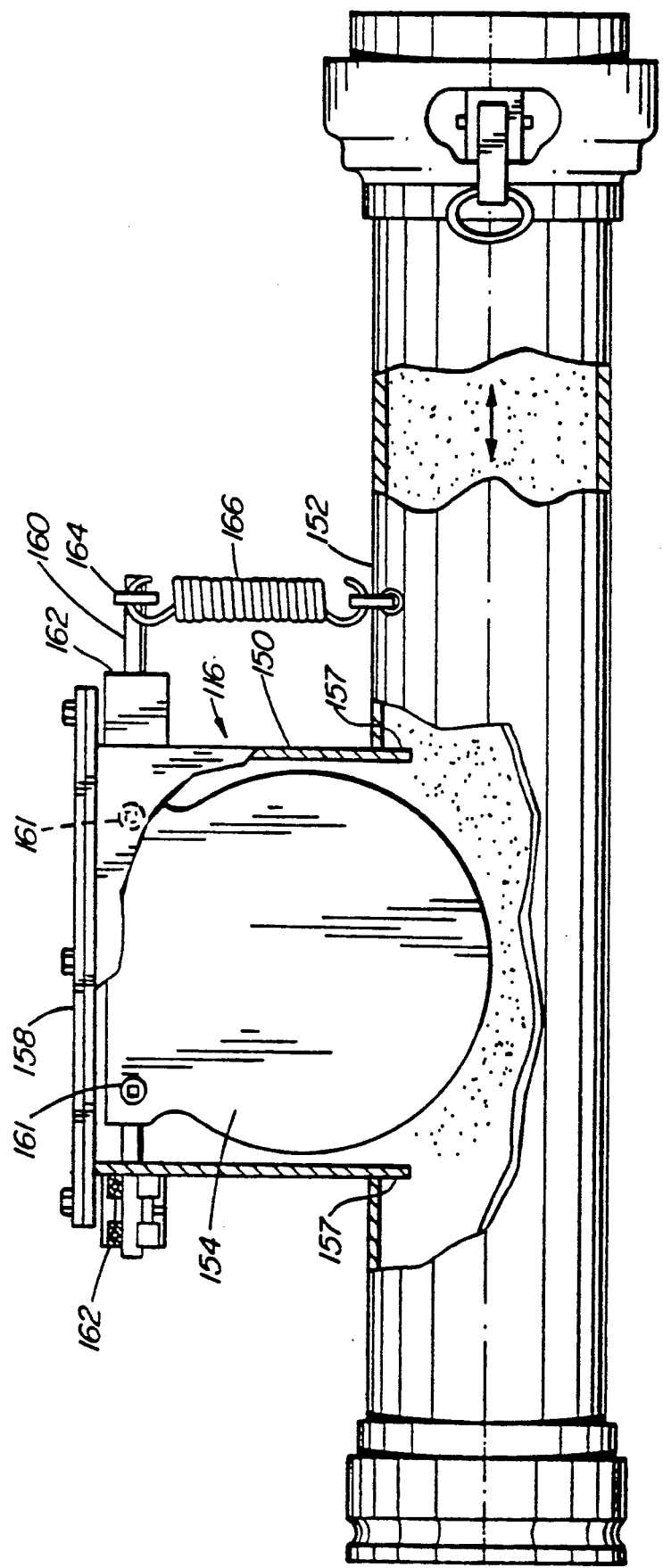
FIG. 9 is a view similar to FIG. 6 showing a modified form of the apparatus.
Figure 11:
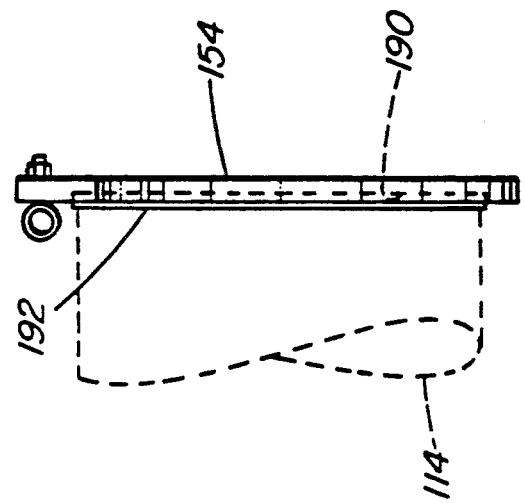
FIGS. 10 and 11 are front and side views of a modified control gate.

Another improvement is shown in FIGS. 7 and 9. As seen in FIG. 9, the gate 154, which butts up against the outlet end of the feed tube 114, is securely fixed to pivot shaft 160 by fasteners 16. Pivot shaft 160 is mounted in the gate chamber 150 via bearings 162. One end of shaft 160 projects outwardly and has a lever 164 secured at right angles to it, the outer end of the lever 164 having a coil tension spring 166 connected to it and to a bracket fixed to air duct section 152. The tension spring serves to bias the gate 154 against the end of the feed tube 114 thus supplementing the force exerted on the gate 154 by the pressure of the air within the gate chamber. This combined action increases the resistance to movement of the bulk material through the feed tube 114 thus enhancing the formation of a moving semi-solid "plug" of bulk material in the tube 114 which forms a seal preventing substantial "blow-back" of material out through the inlet end of the feed tube 114 from the pressurized gate chamber 150. Adjustments in spring tension via any suitable means allows the density of the product "plug" to be varied as desired for different bulk materials. Again, this feature helps reduce loss or escape of bulk material into the environment.

Figure 10:
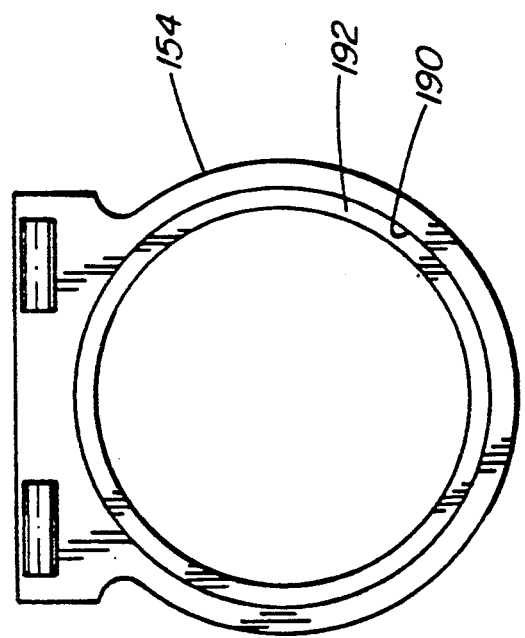

FIGS. 10 and show a further modification which helps reduce "blow-back" of air out through the inlet end of the feed tube 114 especially when little or no material is being conveyed and no "plug" of material is present in the feed tube. The modification comprises an annular groove 190 in the face of the gate 154. An annular "Neoprene" rubber seal 192 is seated and bonded in the groove 190 and is sized to butt up against the exit end of feed tube 114, thus forming a good seal preventing by-pass of air when the gate is closed.

Figure 12:
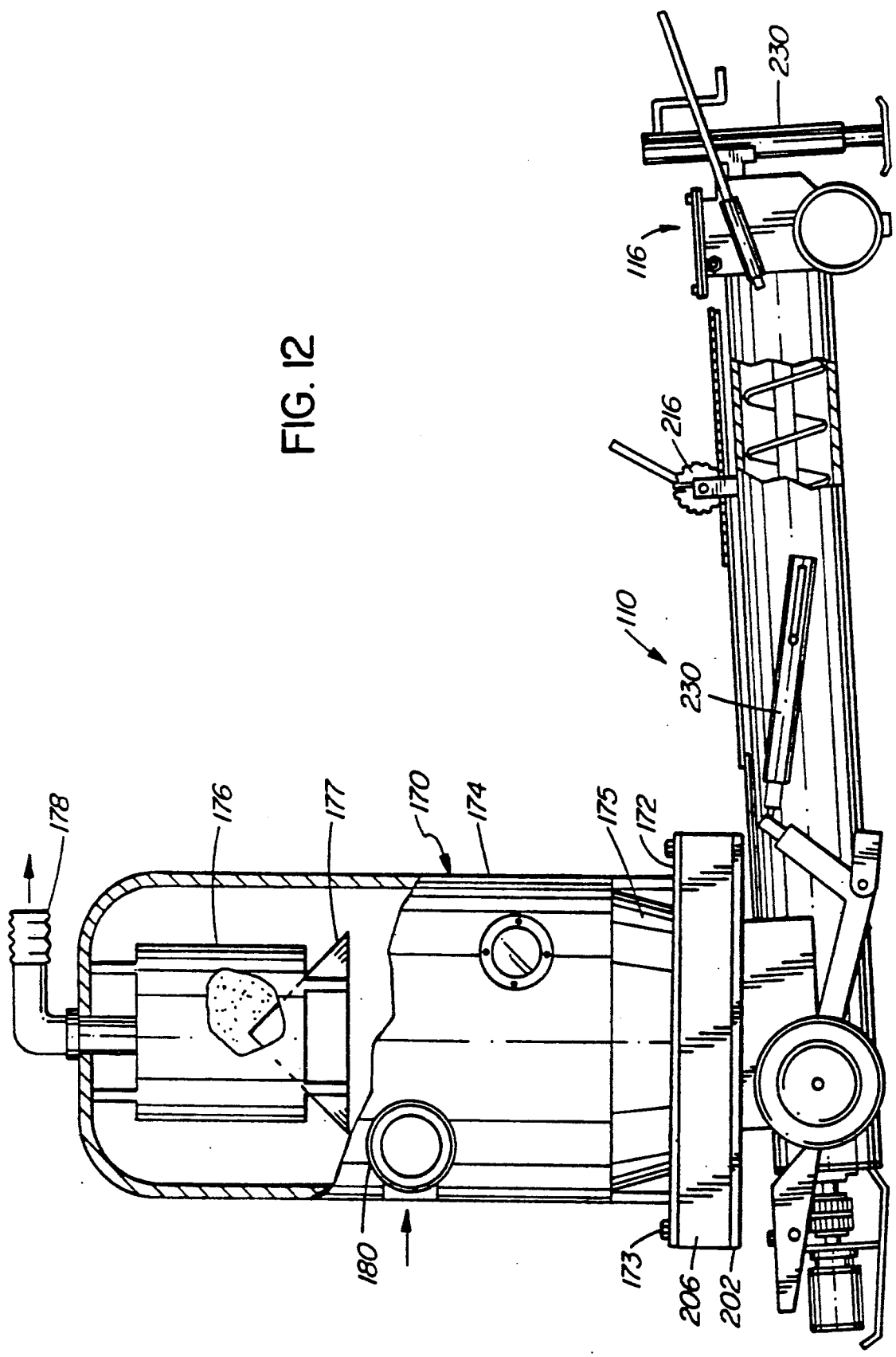
FIG. 12 is a view similar to FIG. 8 but showing a vacuum cyclone separator mounted to the inlet end of the apparatus.

FIG. 12 illustrates a somewhat different mode of use of the apparatus. Here, a vacuum cyclone chamber 170 is mounted over the inlet hopper 200 with its bottom rim 172 in sealed engagement with foam rubber gasket 206 and secured to plate 202 via bolts 173. The cyclone chamber for the most part, is of conventional construction, it includes a cylindrical wall 174 leading into a truncated conical bottom outlet section 175. The upper end of the chamber includes an internal cylindrical sleeve 176 having a conical deflector 177 connected to but spaced below the lower portion thereof. A vacuum outlet 178 is provided at the top center of the chamber and a tangential product inlet 180 is provided in the cylindrical side wall of the chamber. In use a partial vacuum is applied to outlet 178 by a suction fan (not shown). This causes air and the bulk product from a source (not shown) to enter the tangential inlet 180 and to swirl around the chamber vertical axis with the heavier bulk material spiralling outwardly around the chamber wall and moving downwardly by gravity into the conical outlet portion 175. A final separation takes place within the cylindrical sleeve 176 with the spiralling air causing separation of finer materials which spiral downwardly within the sleeve 176 and outwardly along the conical deflector 177, hence spiralling downwardly toward the bottom outlet.

Once the material enters the hopper 200 it is advanced by the feed screw 124 into the fluidizing chamber 116 and is there fluidized and carried off by the moving air as described previously.

The arrangement of FIG. 12 is quite economical to build and operate, certainly as compared with many conventional pneumatic handling systems for grain and the like wherein the vortex chamber must be provided with a suitable airlock at the bottom outlet, often a rotating multi-blade airlock, which form of airlock is often the cause of some complications. The addition of the simple cyclone chamber 170 expands the area of use of the basic material handling apparatus 10, 110 considerably.

Figure 13:
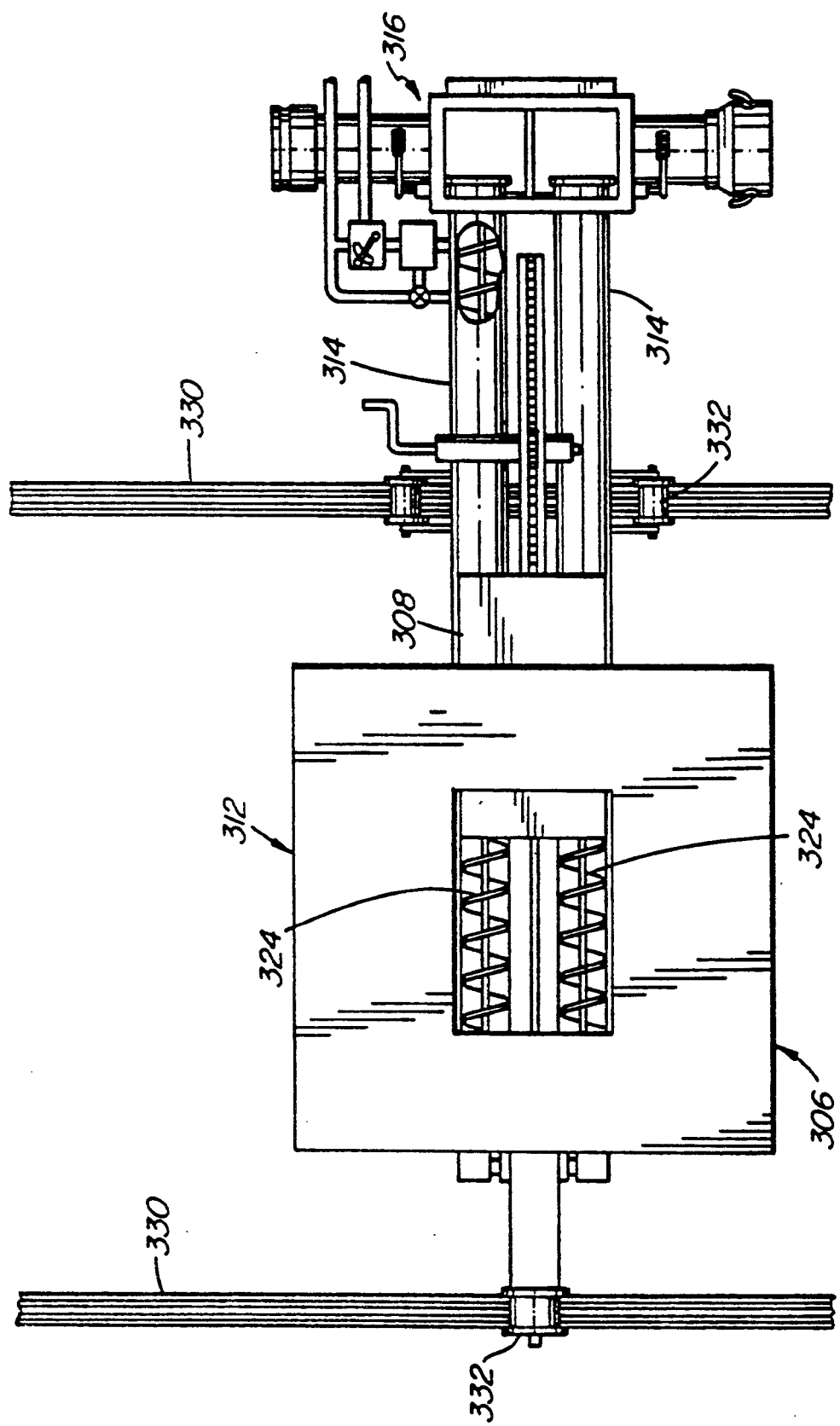
FIG. 13 is a plan view of a still further modification of the invention employing multiple small diameter feed tubes extending from the inlet hopper to a common fluidizing chamber.

The embodiment of FIG. 13 is similar to that described in FIGS. 7-12 except that the single feed tube has been replaced with a pair of small diameter feed tubes 314 arranged in parallel and each having a respective feed auger 324 therein. The twin feed tubes 314 extend between a common feed hopper 312 and a common fluidizing chamber 316. The feed hopper is provided with a gasket 306 as in the preceding embodiment thereby to provide a good seal. By having multiple feed tubes, the tube diameter can be reduced to perhaps 3 or 4 inches while still enabling the same amount of product to be conveyed. The tube diameter reduction, in turn, enables the overall height of the device at the hopper end to be reduced, thus enabling it to be placed under very low hopper cars and the like. The entire apparatus can be mounted on parallel rails 330 as shown via rail wheels 32 and suitable mounting brackets.

FIGS. 14-19 illustrate other possible forms of gates to prevent blow-back from the fluidizing chamber 416 through the feed tube 414.

Figure 14:
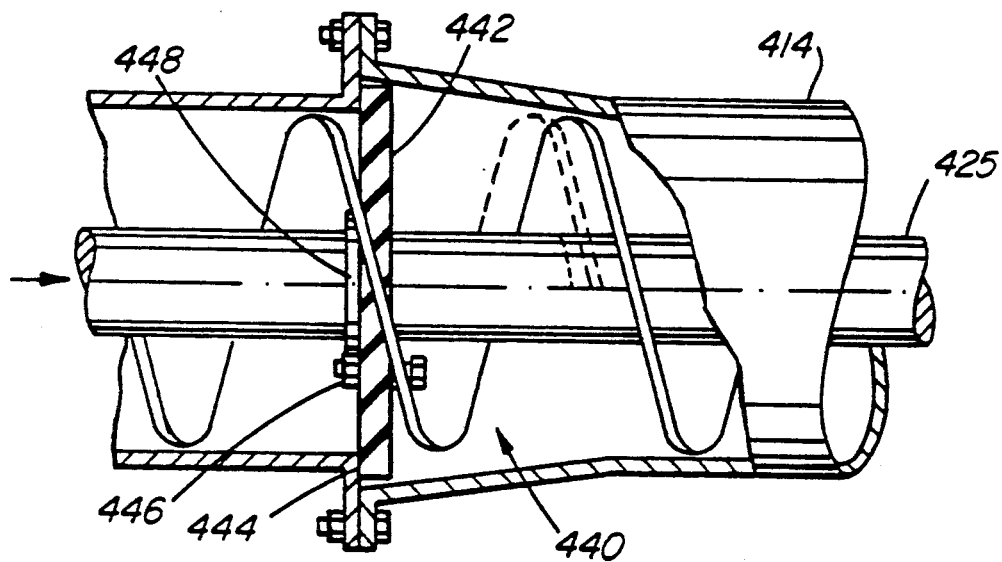
FIG. 14 is a partial section view of the feed tube showing an internal rotating anti-blow back gate on the feed auger.

In. FIG. 14 an internal, rotating anti-blow back gate 440 is shown secured to the feed auger 424. The gate includes a rubber-like disc of material such as "Contico High Wear", a urethane rubber material made by CP Rubber. The gate disc 442 is provided with a central aperture to snugly receive the feed auger shaft 425, and a radial slit (to accommodate the feed auger flight). The perimeter of the gate disc 442 seats on and rotates against an annular step 444 provided in the feed tube 414. The gate disc 442 is bolted to the auger flights via bolts 446 for rotation therewith and a back up plate 448 welded to the feed auger shaft 425 engages the central portion of the gate disc and together with the annular step 444 supports it against air and product pressures. Gate disc 442 deflects into the dashed line position shown in FIG. 14 to allow passage of the bulk fluent material along the feed tube during normal operation.

Figure 15:
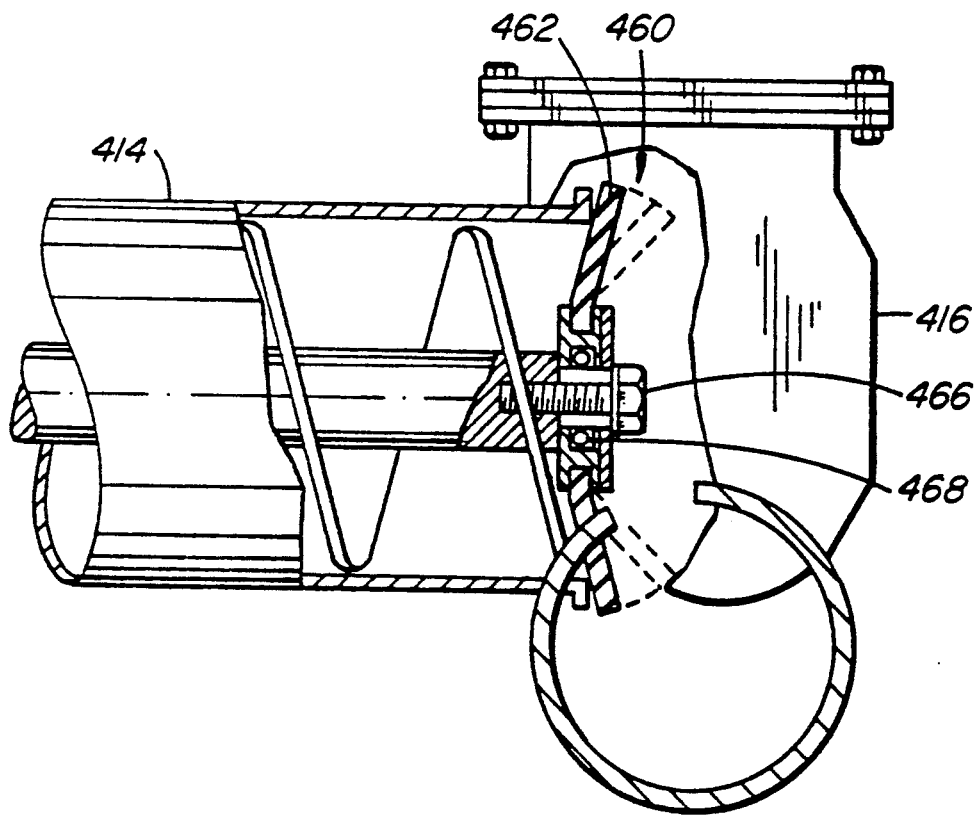
FIGS. 15-18 are partial section and cut away views of the fluidizing chamber showing alternative forms of anti-blow back gates.

Shown in FIG. 15 is an anti-blow back gate 460 including a flexible gate disc 462 of tough rubber-like material such as the urethane rubber noted above, the perimeter of which rests against the outlet end of the feed tube 414 while the center of the disc is connected to auger shaft 425 via flanges and bolts 466 to a central hub 468 including ball bearings which allow free rotation between the feed auger and the disc 462. Hence, during operation, the disc 462 rotates only to the extent the material in contact therewith rotates and, its perimeter portions deflect inwardly to allow the fluent material to fall into the fluidizing chamber 416. Gate 460 thus acts as a one-way anti-blow-back valve as in the rigid gates of the previous embodiments and either supplements or replaces entirely the action of the internal rotating gate 440 described above and shown in FIG. 14.

Figure 16:
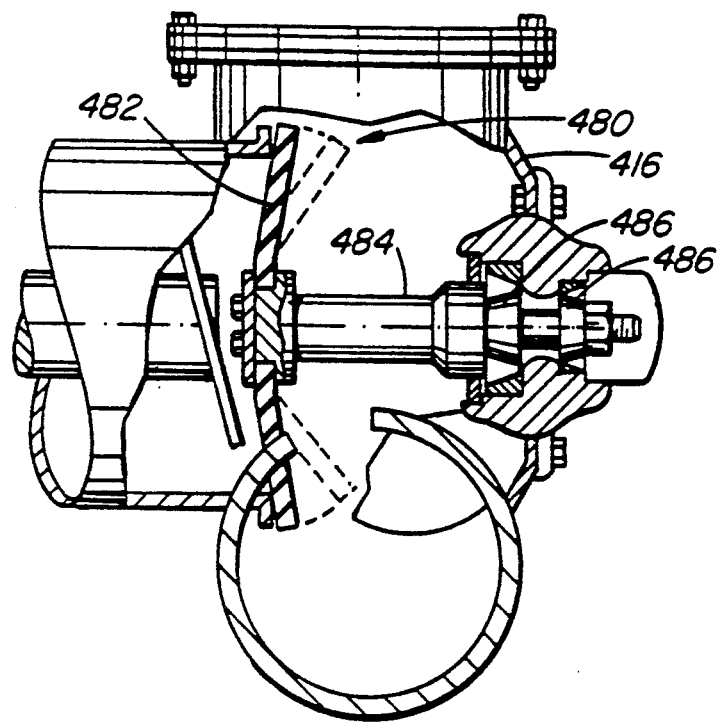

Another form of anti-blow back gate 480 is shown in FIG. 16. This gate 40 again includes a gate disc 482 of resilient material as described above. Disc 482 is centrally mounted via a stub shaft 484 which is journalled for rotation in bearings 486 disposed in hub 488 mounted on the side wall of the fluidizing chamber 416. Deflection of the peripheral portions of the disc occurs to the extent necessary to allow passage of the fluent bulk materials into the fluidizing chamber during use. The gate disc, thus mounted, is always well lined up with the outlet end of the feed tube (which may not always be the case with the FIG. 15 version, especially if the feed auger becomes badly worn).

Figure 17:
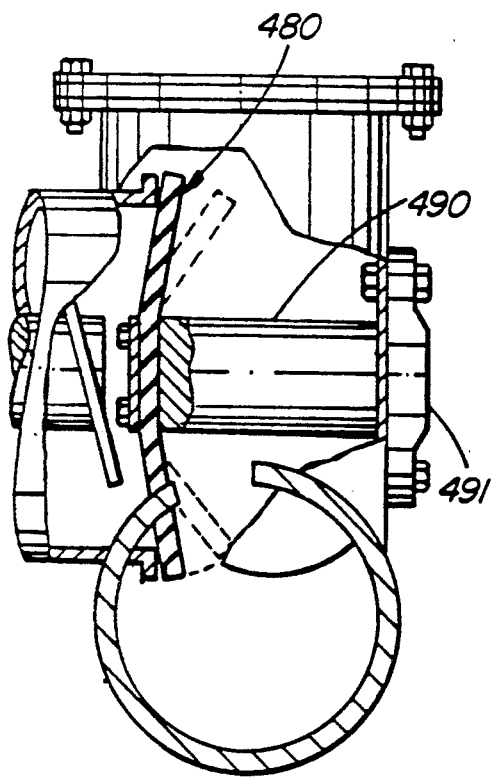

The FIG. 17 version is similar to that of FIG. 16 except that the gate disc 480 is non-rotatably mounted on a fixed stub shaft 490 via mounting flange 491. The action is similar to that described previously except that disc 480 may be prone to greater wear since it cannot follow any rotation of the fluent material during use and hence there may be more relative motion between the fluent material and the disc surface than with the previous embodiments.

Figure 18:
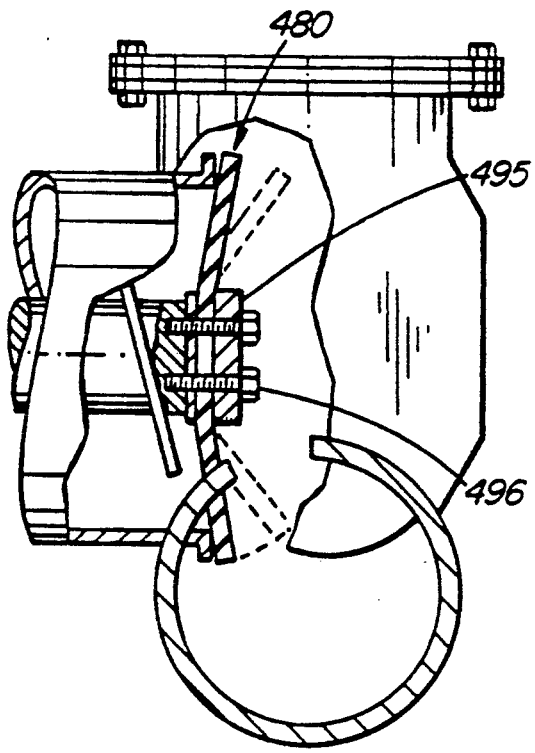

A simple embodiment is shown in FIG. 18 wherein the gate disc 480 is rigidly mounted to the end of a feed auger shaft via a plate 495 and several mounting bolts 496 for rotation therewith. While still quite functional and simple in construction, this version creates greater wear of gate disc 480 as compared with previous embodiments owing to the high degree of relative motion between the gate disc and the end of the feed tube, and between the fluent material and the disc surface.

Preferred embodiments of the invention have been described by way of example. Those skilled in this art will realize that numerous modifications may be made while remaining within the scope of the invention. Accordingly, the invention is not to be limited to the embodiments described. For definitions of the invention reference is to be had to the appended claims.

What is claimed is:

1. Apparatus for introducing fluent bulk materials into a pneumatic conveying line, comprising:
   (a) a fluidizing chamber having an air line inlet and an air line outlet for connection to incoming and outgoing air lines respectively;
   (b) a feed tube connected to the fluidizing chamber and having an outlet end disposed within the fluidizing chamber;
   (c) an assembly for effecting movement of the bulk material through said feed tube from an inlet end portion thereof into the interior of the fluidizing chamber so that the bulk material may, during use, be fluidized by an air flow passing through the fluidizing chamber from said air line inlet to and through said air line outlet and carried therewith out through said air line outlet;
   (d) means for permitting flow of the bulk material into the fluidizing chamber through the feed tube and at the same time preventing blow back of air from the fluidizing chamber through the feed tube and wherein
   (e) said means for permitting flow and preventing blow back includes a gate located at said outlet end of said feed tube within the fluidizing chamber and exposed, in use, to the air flow passing from the air line inlet to and through the air line outlet and responsive to opposing forces exerted thereon by the bulk material moving through the feed tube and the pressure of the air within the fluidizing chamber for permitting flow of said bulk material into said fluidizing chamber through the feed tube and at the same time preventing blow back of air from the fluidizing chamber through said feed tube and further including
   (f) spring means for forcing said gate toward said feed tube so that in use a moving plug of the bulk material forms adjacent said gate thus helping to avoid blow-back of pressurized air from the fluidizing chamber through the feed tube.

2. Apparatus for introducing fluent bulk materials into a pneumatic conveying line, comprising:
   (a) a fluidizing chamber having an air line inlet and an air line outlet for connection to incoming and outgoing air lines respectively;
   (b) a feed tube connected to the fluidizing chamber and having an outlet end disposed within the fluidizing chamber;
   (c) an assembly for effecting movement of the bulk material through said feed tube from an inlet end portion thereof into the interior of the fluidizing chamber so that the bulk material may, during use, by fluidized by an air flow passing through the fluidizing chamber from said air line inlet to and through said air line outlet and carried therewith out through said air line outlet;
   (d) means for permitting flow of the bulk material into the fluidizing chamber through the feed tube and at the same time preventing blow back of air from the fluidizing chamber through the feed tube,
   (e) a low profile inlet connected to the inlet end portion of the feed tube to allow the low profile inlet to be located below the outlet of a hopper, a resilient gasket secured on the low profile inlet and adapted to effect sealing engagement around the outlet of the hopper when brought into close engagement therewith to help prevent escape and loss of the bulk material, and means for lifting and lowering at least that end of the apparatus to which the low profile inlet and the gasket are secured so that when lowered, the apparatus may be positioned with the low profile inlet below and spaced from the outlet of the hopper and the apparatus thereafter raised to bring the gasket into sealed engagement around the outlet of the hopper.

3. Apparatus for introducing fluent bulk materials into a pneumatic conveying line, comprising:
   (a) a fluidizing chamber having an air line inlet and an air line outlet for connection to incoming and outgoing air lines respectively;
   (b) a feed tube connected to said fluidizing chamber and having an outlet end disposed within said fluidizing chamber;
   (c) an assembly for effecting movement of the bulk material through said feed tube from a source of supply into the interior of said fluidizing chamber so that the bulk material may, during use, be fluidized by an air flow passing through said fluidizing chamber from said air line inlet to and through said air line outlet and carried therewith out through said air line outlet;
   (d) a gate located at said outlet end of said feed tube within said fluidizing chamber and exposed, in use, to the air flow passing from the air line inlet to and through the air line outlet and responsive to opposing forces exerted thereon by the bulk material moving through said feed tube and the pressure of the air within said fluidizing chamber for permitting flow of the bulk material into said fluidizing chamber through said feed tube and interacting with the bulk material to prevent blow back of air from said fluidizing chamber through said feed tube; and wherein
   (e) said fluidizing chamber comprises a gate chamber which contains said outlet end of said feed tube and an air duct section, said air duct section comprising a tubular section having said air line inlet and said air line outlet disposed at opposing ends thereof, said gate chamber being secured to and above said air duct section and having a lower end portion opening into and freely communicating with the interior of said air duct section and arranged such that bulk material moving into said gate chamber via said outlet end of said feed tube fall downwardly by gravity from said outlet end of said feed tube and pass directly into a central region of maximum air flow velocity within said air duct section to effect fluidization of the bulk material, (f) and a pair of baffle portions disposed in flanking relation to said gate and projecting within said air duct section which assist in establishing air current patterns and velocities which enhance the fluidization of the bulk material.

4. A conveying system comprising:

a plurality of apparatus for introducing a fluent bulk material into a pneumatic conveying line, each of said apparatus comprises (a) a fluidizing chamber having an air line inlet and an air line outlet for connection to incoming and outgoing air lines respectively;

(b) a feed tube connected to the fluidizing chamber and having an outlet end disposed within the fluidizing chamber;

(c) an assembly for effecting movement of the bulk material through said feed tube from a source of supply into the interior of the fluidizing chamber so that the bulk material may, during use, be fluidized by an air flow passing through the fluidizing chamber from said air line inlet to and through said air line outlet and carried therewith out through said air line outlet;

(d) a gate associated with said feed tube and responsive to opposing forces exerted thereon by the bulk material moving through said feed tube and the pressure of the air within the fluidizing chamber for permitting flow of the bulk material into the fluidizing chamber through said feed tube and at the same time preventing blow back of air from the fluidizing chamber through said feed tube;

each of said apparatus being arranged to receive the bulk material from differing said source of supply and being secured by said air line inlet and the air line outlet to a common pneumatic conveyance line and to a common blower to enable blending of the bulk material.

5. Apparatus for introducing fluent bulk materials into a pneumatic conveying line, comprising:

(a) a fluidizing chamber having an air line inlet and an air line outlet for connection to incoming and outgoing air lines respectively;

(b) a feed tube connected to the fluidizing chamber and having an outlet end disposed within the fluidizing chamber;

(c) an assembly for effecting movement of the bulk material through said feed tube from an inlet end portion thereof into the interior of the fluidizing chamber so that the bulk material may, during use, be fluidized by an air flow passing through the fluidizing chamber from said air line inlet to and through said air line outlet;

(d) means for permitting flow of the bulk material into the fluidizing chamber through the feed tube and at the same time preventing blow back of air from the fluidizing chamber through the feed tube and (d) secured to an inlet portion of the feed tube, there is a vacuum cyclone chamber having a tangential suction inlet for air and the bulk material, and an exit for withdrawing air from the chamber, the inlet and exit arranged so that air and the bulk material spiral in said chamber and the bulk material settles toward the bottom thereof, there being an exit opening in the bottom communicating with the assembly for moving the bulk material through the feed tube toward the fluidizing chamber.

6. Apparatus according to claim 2 wherein the lifting and lowering means comprises ground engaging means for moving between extended and retracted positions, and actuator means for effecting said movement.

7. Apparatus according to claim 6 wherein the ground engaging means includes wheels to permit ready motion of the apparatus along the ground.

8. Apparatus according to claim 2 wherein the gasket comprises a layer of resilient foam material of sufficient breadth and thickness as to effect said sealed engagement.

9. Apparatus according to claim 1 including resilient gasket means for sealing the outlet end of the feed tube to prevent blow back through the feed tube when the gate is closed.

10. Apparatus for introducing fluent bulk materials into a pneumatic conveying line, comprising:

(a) a fluidizing chamber having an air line inlet and an air line outlet for connection to incoming and outgoing air lines respectively;

(b) a feed tube connected to the fluidizing chamber and having an outlet end disposed within the fluidizing chamber;

(c) an assembly for effecting movement of the bulk material through said feed tube from an inlet end portion thereof into the interior of the fluidizing chamber so that the bulk material may, during use, be fluidized by an air flow passing through the fluidizing chamber from said air line inlet to and through said air line outlet and carried therewith out through said air line outlet;

(d) means for permitting flow of the bulk material into the fluidizing chamber through the feed tube and at the same time preventing blow back of air from the fluidizing chamber through the feed tube and wherein (e) said means for permitting flow and preventing blow back includes a gate located at said outlet end of said feed tube within the fluidizing chamber and exposed, in use, to the air flow passing from the air line inlet to and through the air line outlet and responsive to opposing forces exerted thereon by the bulk material moving through the feed tube and the pressure of the air within the fluidizing chamber for permitting flow of said bulk material into said fluidizing chamber through the feed tube and at the same time preventing blow back of air flow the fluidizing chamber through said feed tube and (f) wherein said gate comprises a resilient disc mounted such that perimeter portions of the disc can deflect out of contact with the outlet end of the feed tube to allow passage of the bulk material into the fluidizing chamber.

11. Apparatus according to claim 10 wherein central portions of the disc are secured against motion in the lengthwise direction of the feed tube, the perimeter portions of the disc normally sealing against the outlet end of the feed tube but deflecting away therefrom in response to unbalanced pressures acting on the disc.

12. Apparatus according to claim 11 wherein a feed auger extends through the feed tube to effect said movement of the bulk material therealong.

13. Apparatus according to claim 12 wherein said disc is non-rotatably mounted.

14. Apparatus according to claim 12 wherein said disc is mounted to be freely rotatably about an axis parallel to the lengthwise dimension of the feed tube.

15. Apparatus according to claim 12 wherein said disc is fixed to the feed auger for rotation therewith.

16. Apparatus for introducing fluent bulk materials into a pneumatic conveying line, comprising:
 (a) a fluidizing chamber having an air line inlet and an air line outlet for connection to incoming and outgoing air lines respectively;
 (b) a feed tube connected to the fluidizing chamber and having an outlet end disposed within said chamber;
 (c) an assembly for effecting movement of the bulk material through said feed tube from a source of supply into the interior of the fluidizing chamber so that the material may, during use, be fluidized by an air flow passing through the fluidizing chamber from said air line inlet to and through said air line outlet and carried therewith out through the air line outlet;
 (d) a gate located at said outlet end of said feed tube within the fluidizing chamber and exposed, in use, to the air flow passing from the air line inlet to and through the air line outlet and responsive to opposing forces exerted thereon by the bulk material moving through the feed tube and the pressure of the air within the fluidizing chamber for permitting flow of said bulk material into said fluidizing chamber through the feed tube and interacting with the material to prevent blow back of air from the fluidizing chamber through said feed tube;
 (e) said fluidizing chamber comprising a gate chamber which contains the outlet end of the feed tube and an air duct section, said air duct section comprising a tubular section having said air line inlet and air line outlet disposed at opposing ends thereof, said gate chamber being secured to and above said air duct section and having a lower end portion opening into and freely communicating with the interior of the air duct section and arranged such that bulk materials moving into the gate chamber via the outlet end of the feed tube fall downwardly by gravity from the end of the feed tube and pass directly into a central region of maximum air flow velocity within the air duct section to effect fluidizing of the bulk material,
 (f) said gate being arranged for movement from a closed position in close contacting relation to the outlet end of the feed tube to and through a range of partially open positions, and said gate being disposed in the fluidizing chamber such that, during use, a substantial lower portion thereof is disposed within the region of maximum air flow velocity so that the resulting air currents sweep along the gate and tend to keep the gate clear of deposits which might otherwise tend to prevent full closure of the gate.

17. Apparatus according to claim 16 wherein said air line inlet and said air line outlet are located along a first axis extending along said air duct section and wherein said feed tube defines a further axis which is generally transversely arranged relative to the first axis.

* * * * *

UNITED STATES PATENT AND TRADEMARK OFFICE
CERTIFICATE OF CORRECTION

PATENT NO. : 5,125,771

DATED : June 30, 1992

INVENTOR(S) : Alvin Herman et al

It is certified that error appears in the above-identified patent and that said Letters Patent is hereby corrected as shown below:

Column 14, line 11 "by fluidized" should be --be fluidized--.

Column 15, line 61, "outlet" should be --outlet and carried therewith out through said air line outlet;--

Column 15, line 67, paragraph "d" should be paragraph --e--.

Column 18, line 17, "effect fluidizing" should be --effect fluidization--.

Signed and Sealed this

Twenty-fourth Day of August, 1993

Attest:

BRUCE LEHMAN

Attesting Officer     Commissioner of Patents and Trademarks